United States Patent [19]
Bianchini

[11] 3,923,583
[45] Dec. 2, 1975

[54] MACHINE FOR THE COUPLING OF FABRICS

[76] Inventor: Giacomo Bianchini, Via S. Bernardo 22, Cascina Nuova di Bollate (Milan), Italy

[22] Filed: Feb. 14, 1973

[21] Appl. No.: 332,386

[30] Foreign Application Priority Data
Feb. 16, 1972   Italy .................................. 20627/72

[52] U.S. Cl. .................... 156/378; 38/44; 156/380; 156/499; 156/389; 156/583; 156/494; 226/171
[51] Int. Cl.² ......................................... B32B 31/04
[58] Field of Search ........... 156/555, 583, 380, 378, 156/389, 582, 494, 539, 499, 558, 535, 559, 405, 137, 309, 324, 543, 547; 223/4; 26/18.6; 38/44, 54, 48, 55; 226/171; 162/58, 60, 59, 61

[56] References Cited
UNITED STATES PATENTS

| | | | |
|---|---|---|---|
| 2,107,485 | 2/1938 | Liebowitz ........................... | 156/555 |
| 2,334,485 | 11/1943 | Ettl ..................................... | 156/555 |
| 2,385,456 | 9/1945 | Marcy ................................. | 156/220 |
| 2,702,406 | 2/1955 | Reed ................................... | 156/494 |
| 2,788,838 | 4/1957 | Crabbe et al. ...................... | 156/380 |
| 3,038,833 | 6/1962 | Glover ................................ | 156/498 |
| 3,055,496 | 9/1962 | Dunlap ............................... | 26/18.6 |
| 3,236,714 | 2/1938 | Liebowitz ........................... | 156/555 |
| 3,258,386 | 6/1966 | Blythe ................................ | 156/583 |
| 3,558,254 | 1/1971 | Cahill .................................. | 226/193 |
| 3,558,400 | 1/1971 | Horvath et al. .................... | 156/380 |
| 3,570,085 | 3/1971 | Heinemann ........................ | 26/18.6 |
| 3,663,340 | 5/1972 | Ross .................................... | 156/555 |
| 3,694,289 | 9/1972 | Piazze ................................. | 156/380 |

FOREIGN PATENTS OR APPLICATIONS
565,550   11/1958   Canada .............................. 162/360

*Primary Examiner*—Douglas J. Drummond
*Assistant Examiner*—J. J. Gallagher
*Attorney, Agent, or Firm*—Kane, Dalsimer, Kane, Sullivan and Kurucz

[57] ABSTRACT

A machine for the coupling of a fabric with a stiffening or reinforcing interlining by means of interposition of an adhesive layer, including a compressing device and a heating device, the improvement residing in the fact that the compressing device consists of a Teflon felt carpet, which winds and slides in contact with three rollers having their respective axes disposed on the same vertical line and which is subtended by a front roller, maintained in tension by a pair of either pneumatic or hydraulic cylinders, the lower roller of said three rollers being pushed to the central roller with a variable pressure and the central roller having a large diameter than that of the other two rollers, the fabrics having to undergo the treatment being fed to the machine between the central roller and the carpet, and the heating device consists of two series of infrared ray heaters, contained in the casings disposed laterally to the central roller, and the temperature being checked by a probe maintained in contact with the central roller in an area in the vicinity of the entrance zone of the fabric to be treated.

7 Claims, 7 Drawing Figures

MACHINE FOR THE COUPLING OF FABRICS

The invention relates to an improved machine for the continuous coupling of fabrics, in general, with other fabrics or reinforcing adhesive coated interlinings.

Also the manufacturing and functional method of the aforesaid improved machine is an integral part of the present invention.

As is well known, in the suit making industry it is standard practice to associate with a basic fabric a stiffening and reinforcing interlining, consisting preferably of hempen cloth or other similar tissue.

In order to accomplish said operation, there are commercially available machines in which said association is generally obtained by subjecting the two coupled fabrics of which the reinforcing fabric is coated with a layer of suitable adhesive means to a heating and simultaneous compression treatment.

It is further well known that the temperature at which the two fabrics to be coupled with each other undergo said treatment should be checked with a certain precision and depending on the fabric thickness, type of adhesive means used and treatment time of the fabrics themselves.

By operating in fact at too high temperatures the resultant coupled tissue may show an excessive rigidity, due to the polymerization of the layer of intermediate adhesive means.

Conversely, if the treatment temperature is below a certain limit and the time of the treatment itself is inadequate, then imperfectly coupled fabrics would result, likely, therefore, to be easily detached from each other with use.

The improved machine according to the present invention obviates the above-outlined inconveniences by accomplishing a perfect and lasting coupling of the fabric with the interlining or reinforcement.

As a matter of fact, in the improved machine of this invention the heat is homogeneously distributed over both surfaces of the superposed fabrics to be coupled with each other and continuously checked and maintained at a constant value; the dwell time of the fabric in the heated area may be varied at will as well as the pressure.

More accurately, in the improved machine according to the present machine both superposed fabrics to be coupled with each other pass between a Teflon (polytetrafluoroethylene) carpet and a roller, coated in turn with a layer of Teflon.

A pair of infra-red ray heatene, disposed respectively from opposite bands relative to said roller, provide to heat both the teflon carpet and the roller the temperature of which is constantly checked through a probe.

Furthermore, the peripheric speed of the roller and consequently also the travel speed of the carpet may be changed within wide limits so as to adjust the treatment time of the fabrics to be coupled with each one as a function of the aforementioned parameters.

Furthermore the pressure which the two fabrics to be coupled with each other during the treatment are subjected to is exerted by a second roller, which tightens the Teflon carpet against the first Teflon coated roller and the exerted pressure may be varied at will depending on the different requirements, the bearings of the second roller being integral with the pistons of two either hydraulic or pneumatic cylinders.

These and further characteristic features of a functional and constructional nature of the improved machine for couplings fabrics according to the present invention could be better understood from the following detailed description taken in conjunction with the various figures on the accompanying drawings, in which.

Figure 6:
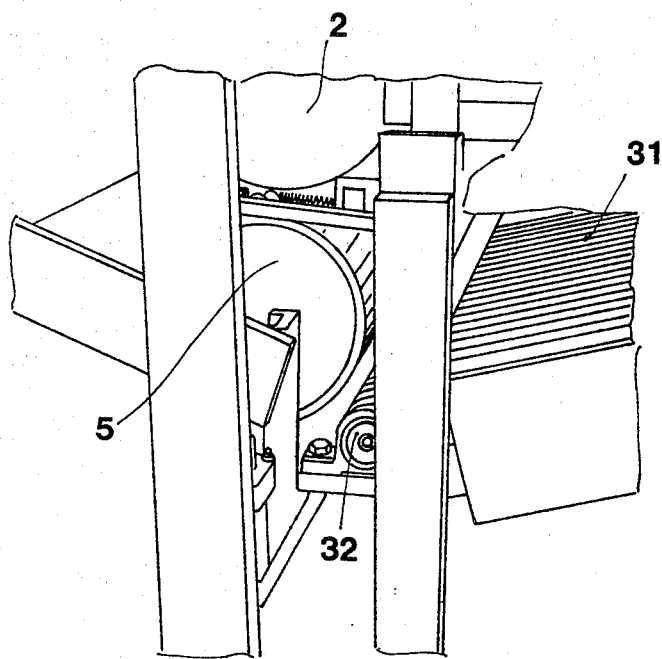
Figure 7:
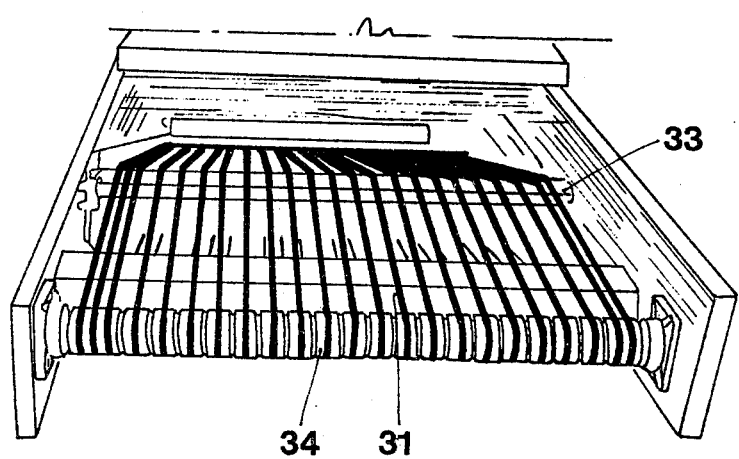

FIG. 6 shows in schematical perspective view a portion of the lower roller, which exerts a compression on the fabrics to be coupled with each other, and a portion of the belt conveyor of the fabrics themselves, after their coupling; and FIG. 7 represents in a front perspective view the upper portion of the belt conveyor in FIG. 6, in case it consists, as preferably occurs, of a plurality of parallel running, from each other suitably spaced strings.

Referring now particularly to the numeral symbols of the various figures on the accompanying drawings, the improved machine for the coupling of fabrics according to the present invention is made up of a bed plate 1 on which the fabrics or fabric parts to be coupled with each other are placed.

The above-mentioned fabrics are being conveyed by hand or suitable devices between a central roller 2 and a belt carpet 4, consisting of Teflon, subtended by an upper roller 3.

The aforesaid belt carpet 4 slides in contact with the upper roller 3 and subsequently central roller 2, which rotates loosely and is driven by the belt carpet 4 itself.

Subsequently, the aforementioned belt carpet 4 winds on a lower roller 5, preferably coated with silicone rubber, which is provided with proper motion and, therefore, drives the belt carpet 4.

The support pins of the lower roller 5 are located inside two movable support members 6 and 7.

Said support member may vertically slide inside specially provided guides and are maintained in upwardly pushed position by the pistons of two pneumatic and hydraulic cylinders 8 and 9, to which said support members are securely fixed.

The pistons may, therefore, impart an adjustable pressure to the lower roller 5, which is pushed in this manner against the central roller 2.

Figure 1:
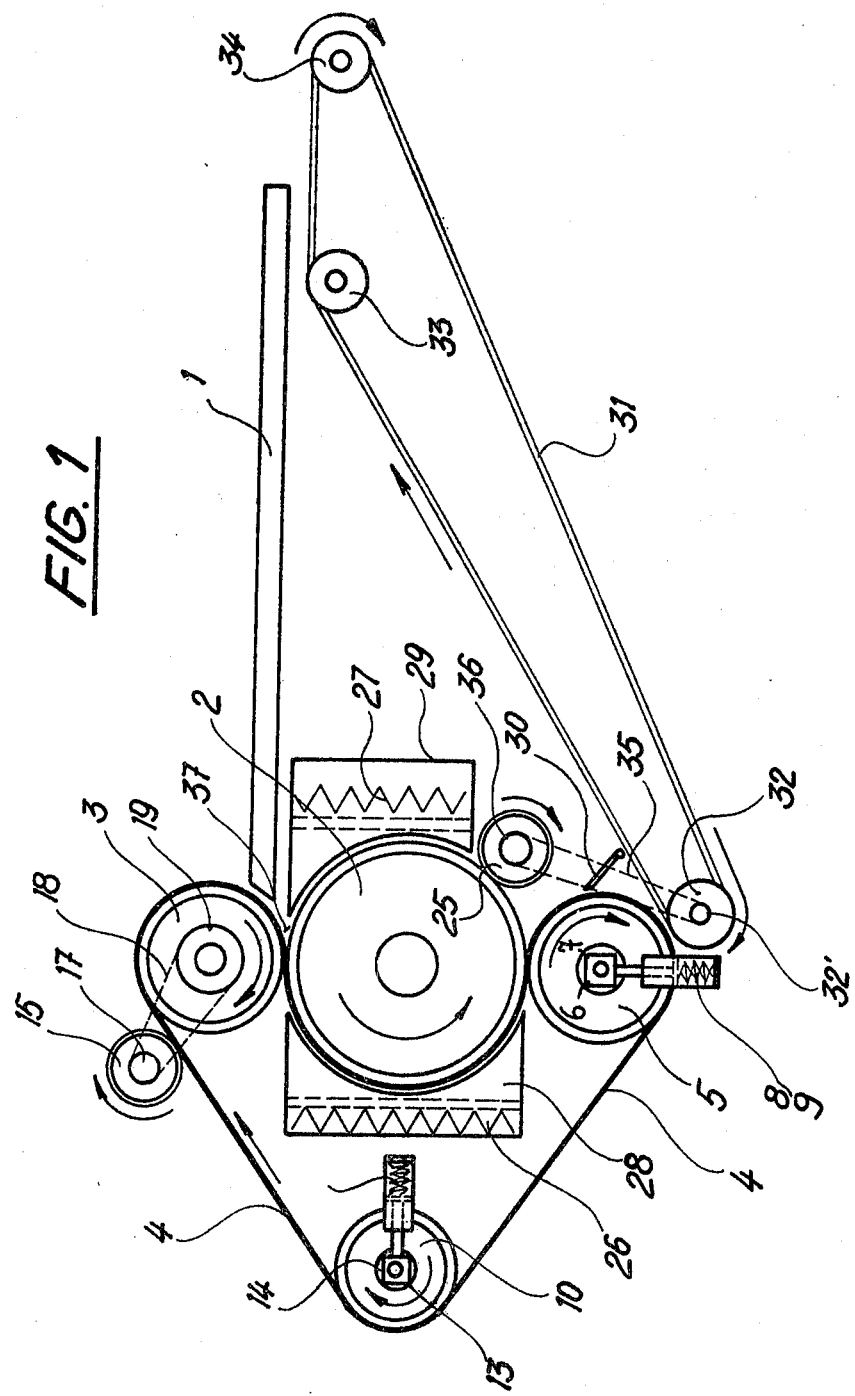
FIG. 1 represents in a schematical view in vertical section some operating components of the machine of this invention.
Figure 2:
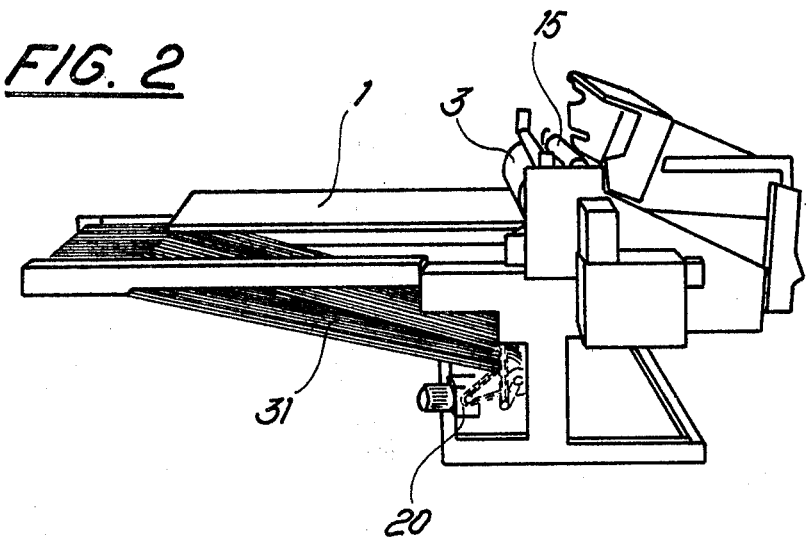
FIG. 2 shows the machine in FIG. 1 represented in perspective side view.
Figure 3:
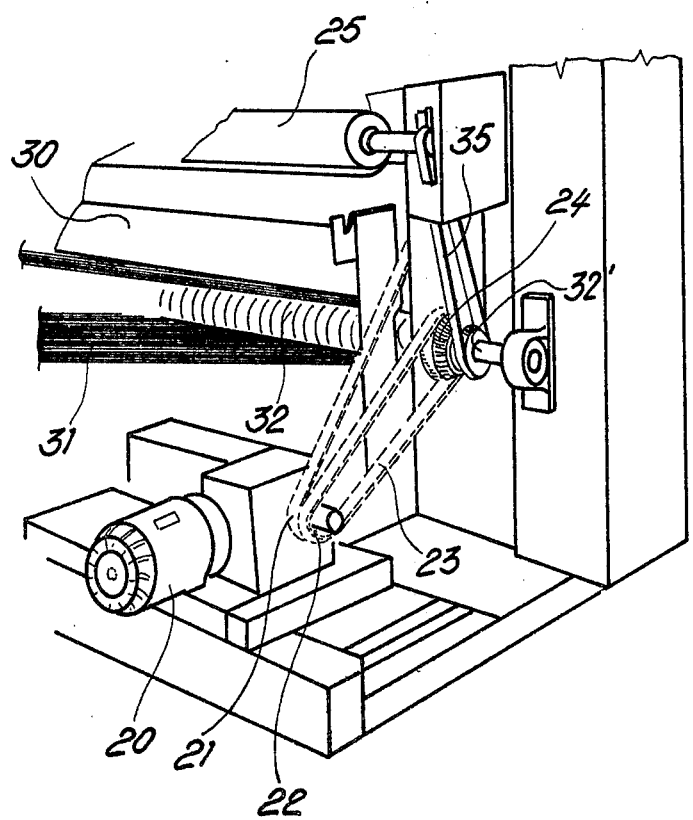
FIG. 3 shows particularly and in a schematical view the drive of the motion with which the machine is provided and the motor.
Figure 4:
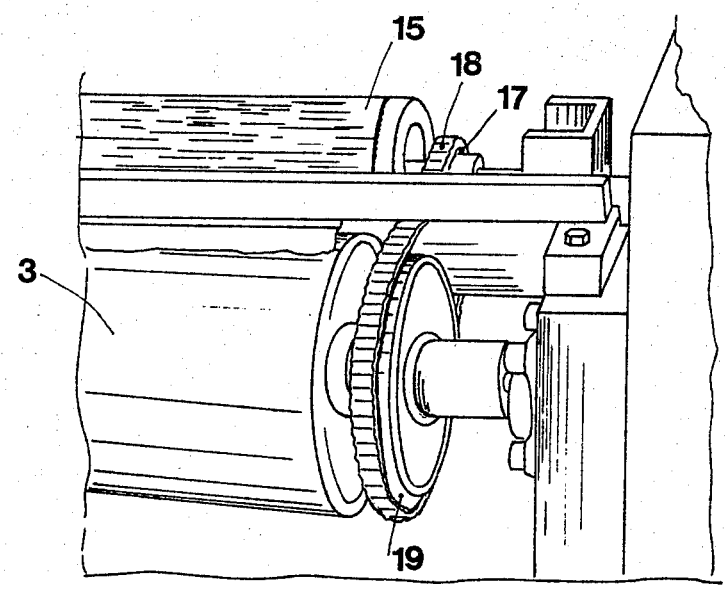
FIG. 4 shows partially and in perspective view the upper roller serving as guiding means for the teflon belt carpet and the roller for the cleaning of the belt itself with their connecting system.
Figure 5:
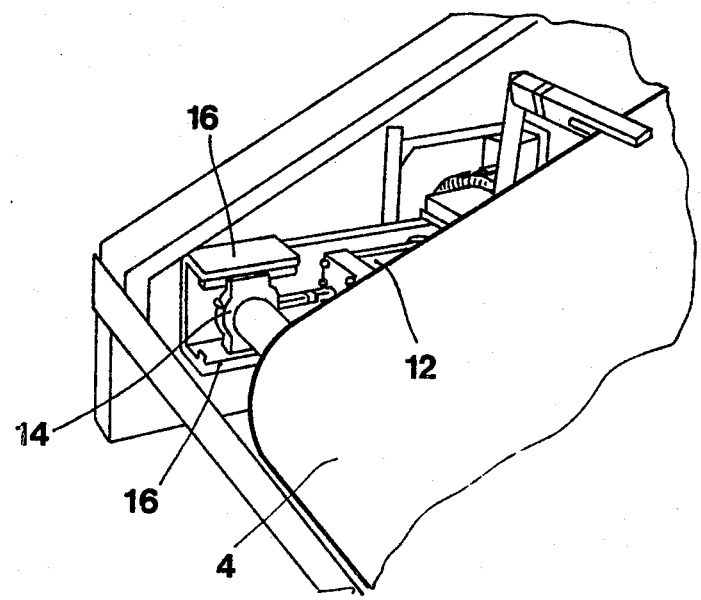
FIG. 5 represents partially and in perspective view the front roller for the tension of the continuous Teflon roller.

The Teflon belt carpet 4 slides further in contact with the front guide roller 10, maintained in tension by a pair of either pneumatic or hydraulic cylinders 11 and 12 (s. FIG. 5), the latter exerting a pressure and a consequent horizontal forward displacement on two support members 13 and 14, which may slide inside equally horizontal guides 16 and 16′.

The axes of the three rollers 3, 2 and 5 are disposed on the same vertical and in the same plane and the diameter of the central roller 2 is larger than that of the other two ones.

The improved machine of this invention is also provided with an upper cleaning roller 15, which rotates in contact with the belt carpet 4 and in an opposite direction to the sliding direction of the belt carpet 4.

Said upper cleaning roller 15 is integral with a pinion or pulley 17 on which a chain or belt 18 slides, driven by a pinion or pulley 19, integral with the upper roller 3.

The aforesaid cleaning roller 15 is covered with a silicone felt and has the task of removing from the belt carpet 4 resin residuals, if any, which might ouflow from the fabrics during the thermo-melting treatment under pressure.

The motion to the various machine rollers is given by a speed change gearbox 20 on the shaft of which there are keyed two pinions 21 and 22.

The pinion 21 drives via a chain the lower roller 5, which delivers in turn motion to the belt carpet 4.

The latter drives in turn the central roller 2, the upper roller 3 and the front guide roller 10.

The pinion 22 drives instead a chain 23, which rotates a pinion 24, integral with a shaft 32, actuating an exit conveying apparatus 31.

On the shaft 32 there is keyed a second pinion 32' which through a chain 35 and a pinion 36 rotates the cleaning roller 25.

Said roller 25 rotates in contact with the central roller 2, thereby describing a rotation motion in a contrary direction to that of the central roller itself.

Said second cleaning roller 25 cleans the central roller 2 from resin residuals, if any, likely to outflow through the coupled fabrics to be submitted to the treatment.

The coupled fabrics are in fact caused to pass between the belt carpet 4 and the central roller 2, which is coated with a Teflon layer.

The roller 2 is heated by two series of infra-red ray heating resistances 26 and 27, contained in specially provided casings 28 and 29, being disposed laterally and on opposite sides of the roller itself.

The aforesaid roller is consequently heated at its two surface portions being opposite each other.

By this arrangement, the fabrics to be coupled with each other are submitted to a uniform heating operation, which provokes the thermo-melting of the resins, applied either to the hempen cloth or the reinforcing fabric.

Thereafter, the above-mentioned fabrics to be coupled with each other are being subjected to an adjustable pressure, exerted by the lower roller 5 relative to the central roller 2 via the cylinders 8 and 9.

The thus obtained coupled fabrics are then detached from the belt carpet 4 at the cylinder 5 by the blade 30, disposed in contact with the surface of the carpet itself.

The coupled fabrics fall by gravity into the belt conveyor 31, consisting preferably of a plurality of elastic strings, winding the rollers 32, 33 and 34, provided with spacing grooves and the roller 32 of which has a proper motion, whereas the rollers 33 and 34 rotate loose and are driven by the motion of the strings themselves.

The heat of the infra-red ray heaters 26 and 27 is constantly checked via a probe 37, which is maintained in contact with the central roller 2 over which it crawls und which is connected to a (not shown) thermostatic control organ.

In this manner, it is possible to regulate with considerable precision the temperature of the central roller itself.

The resistance 26 heats further the belt carpet 4, consisting of Teflon, which transmits its own heat by conduction to the fabrics to be coupled with each other.

As mentioned before, the improved machine of this invention is actuated by a speed change gearbox 20, which permits to suitably vary, within determined limits the travel speed of the carpet 4 and consequently the endurance of the thermo-melting treatment of the resin layer, comprised between the two superposed fabrics.

In this manner, it is possible to subject the various fabrics to be coupled with each other to a differentiated thermo-melting treatment of the adhesive layer, ensuring a perfect melting of the latter and its better penetration of the fabrics' fibres.

As a matter of fact, the treatment temperature varies as is well known depending on the nature of the resin, the colour and the type of the fabrics to be coupled with each other as well as their thickness.

From the foregoing, and perusal of the various figures on the accompanying drawings it is easy to see the greater functional character and the practical application of the improved machine according to this invention.

Obviously, said machine and related manufacturing and functional method have been previously described and represented by way of non-limiting example and to demonstrate the practical performance and the general features of this invention.

From the above it may, therefore, be easily inferred that in the practical embodiment of the improved machine of this invention several changes and modifications as to shape, construction and dimensions may be introduced without departing from the spirit of this invention.

It is, therefore, understood that any such changes and modifications shall be deemed as falling within the scope of this invention.

I claim:

1. In a machine for the coupling of a fabric with an interlining by means of the interposition of an adhesive layer including a compressing device and a heating device, said compressing device including: upper, central and lower rollers with axes fixedly disposed in the same plane, a guide roller displaced from the plane of the said upper, central and lower rollers, a continuous belt disposed about the surfaces of said upper and lower rollers on one side of said plane and on the surface of said central roller on the remaining side of said plane, said lower roller being the drive roller for said belt, means for yieldingly urging said front roller away from said central roller whereby slack in said belt is taken up, second means for yieldingly urging said lower roller toward said central roller whereby the fabrics to be coupled having been received between said belt and said central roller is maintained in contact therewith; and said heating device including: two infra-red ray heaters disposed on opposite sides of said central roller; a probe in contact with said central roller indicating the temperature thereof and an exit conveyor which is continuous and tangential with said belt.

2. Machine as defined in claim 1, wherein the lower roller is coated with silicone rubber.

3. Machine as defined in claim 1, wherein said second means includes lower roller support pins located inside two movable support members for vertically sliding inside guides and which are maintained in upwardly pushed position by the cylinder pistons.

4. Machine as defined in claim 1, wherein the belt is cleaned by a first cleaning roller disposed on the surface thereof, covered with a silicone felt, said first cleaning roller rotating in contact with said belt and in a direction opposite the direction of motion of the belt, and being driven by a chain or drive belt suspended between the pinion of said first cleaning roller and that of said upper roller.

5. Machine as defined by claim 4, wherein the central roller is covered with a polytetrafluoroethylene layer.

6. Machine as defined by claim 4, wherein the central roller is cleaned by a second cleaning roller which is caused to rotate in contact with said central roller.

7. Machine as defined in claim 1, wherein the coupled fabrics are detached from the belt by means of a blade disposed in contact with the surface of the belt at said lower cylinder.

* * * * *